(12) United States Patent
Defrancesco et al.

(10) Patent No.: US 6,681,591 B2
(45) Date of Patent: Jan. 27, 2004

(54) CABIN AIR TEMPERATURE CONTROL WITH COOLING OF RECIRCULATED AIR

(75) Inventors: Gregory Defrancesco, Simsbury, CT (US); Thomas Zywiak, Suffield, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 5 days.

(21) Appl. No.: 10/037,798

(22) Filed: Jan. 4, 2002

(65) Prior Publication Data

US 2003/0126879 A1 Jul. 10, 2003

Related U.S. Application Data

(60) Provisional application No. 60/347,918, filed on Oct. 19, 2001.

(51) Int. Cl.[7] .............................. F25D 9/00; F28B 9/00
(52) U.S. Cl. ........................................ 62/401; 62/172
(58) Field of Search ....................... 62/401, 402, 172, 62/427

(56) References Cited

U.S. PATENT DOCUMENTS

| | | | | |
|---|---|---|---|---|
| 4,021,215 A | * | 5/1977 | Rosenbush et al. ............ | 62/402 |
| 4,262,495 A | * | 4/1981 | Gupta et al. ................... | 62/402 |
| 4,374,469 A | * | 2/1983 | Rannenberg .................. | 62/402 |
| 4,430,867 A | * | 2/1984 | Warner .......................... | 62/402 |
| 4,445,342 A | * | 5/1984 | Warner .......................... | 62/172 |
| 4,769,051 A | | 9/1988 | Defrancesco | |
| 4,829,775 A | * | 5/1989 | Defrancesco .................. | 62/90 |
| 4,963,174 A | * | 10/1990 | Payne ............................ | 62/87 |
| 4,966,005 A | * | 10/1990 | Cowell et al. ................. | 62/79 |
| 5,086,622 A | * | 2/1992 | Warner .......................... | 62/88 |
| 5,323,624 A | * | 6/1994 | Schwalm ...................... | 62/401 |
| 5,461,882 A | | 10/1995 | Zywiak | |

OTHER PUBLICATIONS

International Search Report mailed Feb. 12, 2002.

* cited by examiner

Primary Examiner—William C. Doerrler
(74) Attorney, Agent, or Firm—Carlson, Gaskey & Olds

(57) ABSTRACT

A cabin air temperature control system includes cooling recirculated air. A first air circuit includes an intake that receives air from outside the cabin and then conditions the air to bring it closer to a desired cabin temperature before the air is introduced into the cabin. A second air circuit recirculates air from the cabin and then reintroduces it back into the cabin. The second circuit includes an air cooling assembly, comprising a heat exchanger, that is selectively used to cool the recirculated air before it is reintroduced into the cabin. A bypass flow arrangement is provided to selectively direct the recirculated air through the air cooling assembly or to simply recirculate it back into the cabin depending on the current temperature adjustment needs.

8 Claims, 1 Drawing Sheet

CABIN AIR TEMPERATURE CONTROL WITH COOLING OF RECIRCULATED AIR

CROSS REFERENCE TO RELATED APPLICATIONS

This application claims priority to U.S. Provisional Application No. 60/347,918, which was filed on Oct. 19, 2001.

BACKGROUND OF THE INVENTION

This invention generally relates to air temperature control in aircraft cabins, for example. More particularly, this invention relates to a strategy for controlling temperature in a vehicle cabin by cooling recirculated air.

Aircraft and other vehicles include cabin temperature control systems that provide a desired air temperature within the cabin. In the case of aircraft, the cabin is pressurized and the pressurized air is brought close to a desired temperature so that individuals within the cabin remain comfortable. A variety of cabin air temperature control systems are known.

One challenge facing designers of such systems is achieving optimum system performance while staying within the limitations on power consumption and packaging, which are typically imposed by the nature of aircraft or other vehicles. Minimizing the use of power is important so that power source size and expense, fuel consumption or both are kept within acceptable, economical levels. Space also typically is limited and packaging such a system must fit within tight guidelines.

Typical aircraft cabin air conditioning systems include an air cycle machine that utilizes outside air, conditions the outside air to bring the temperature of such air closer to a desired cabin temperature and then introduces the conditioned air into the cabin. Such systems also typically include recirculation of the cabin air. The recirculated cabin air typically is not conditioned (not cooled or not heated), but rather is simply recirculated. The recirculated air sometimes is mixed with the conditioned air so that a mixture of the recirculated air and the conditioned air is introduced into the cabin.

One drawback associated with typical arrangements is that desired temperature levels are not always readily achieved. For example, on warm days when an aircraft is on the ground, the system is not capable of adequately cooling air to keep the cabin at a comfortable temperature level. It is desirable to increase the cooling capacity of a cabin air temperature control system without increasing power consumption or drastically changing the configuration of the system so that the system stays within industry recognized packaging constraints.

This invention provides a unique solution to the problem of achieving adequate temperature control of cabin air without requiring additional power consumption compared to conventional arrangements.

SUMMARY OF THE INVENTION

In general terms, this invention is a cabin air temperature control system that includes selectively cooling recirculated cabin air before the recirculated air is reintroduced into the cabin.

A system designed according to this invention includes a first air flow circuit having an inlet that receives air from outside of the cabin. An air conditioner assembly adjusts the temperature of the outside air to bring it closer to a desired cabin temperature. The conditioned air is then introduced into the cabin. A second air flow circuit recirculates air from the cabin back into the cabin. A recirculation air cooling assembly is provided in the second circuit to selectively cool the recirculated air before it is reintroduced into the cabin.

In one example, the recirculated air cooling assembly comprises a heat exchanger.

Under circumstances where it is not necessary or desirable to cool the recirculated air, a bypass flow pathway is utilized to direct the recirculated air back into the cabin without cooling it. A temperature sensor and a controller communicate so that the controller can determine whether the recirculated air should be cooled based upon a currently desired cabin temperature and a current recirculated air temperature. The controller preferably controls an air flow control device to direct the recirculated air through the recirculating air cooling assembly or, alternatively, through the bypass so that the recirculated air is not cooled.

The recirculated air preferably is mixed with the conditioned air from the first circuit so that a mixture of the conditioned air and the recirculated air is introduced into the cabin.

The various features and advantages of this invention will become apparent to those skilled in the art from the following detailed description of the currently preferred embodiments. The drawing that accompanies the detailed description can be briefly described as follows.

DETAILED DESCRIPTION OF THE PREFERRED EMBODIMENTS

Figure 1:
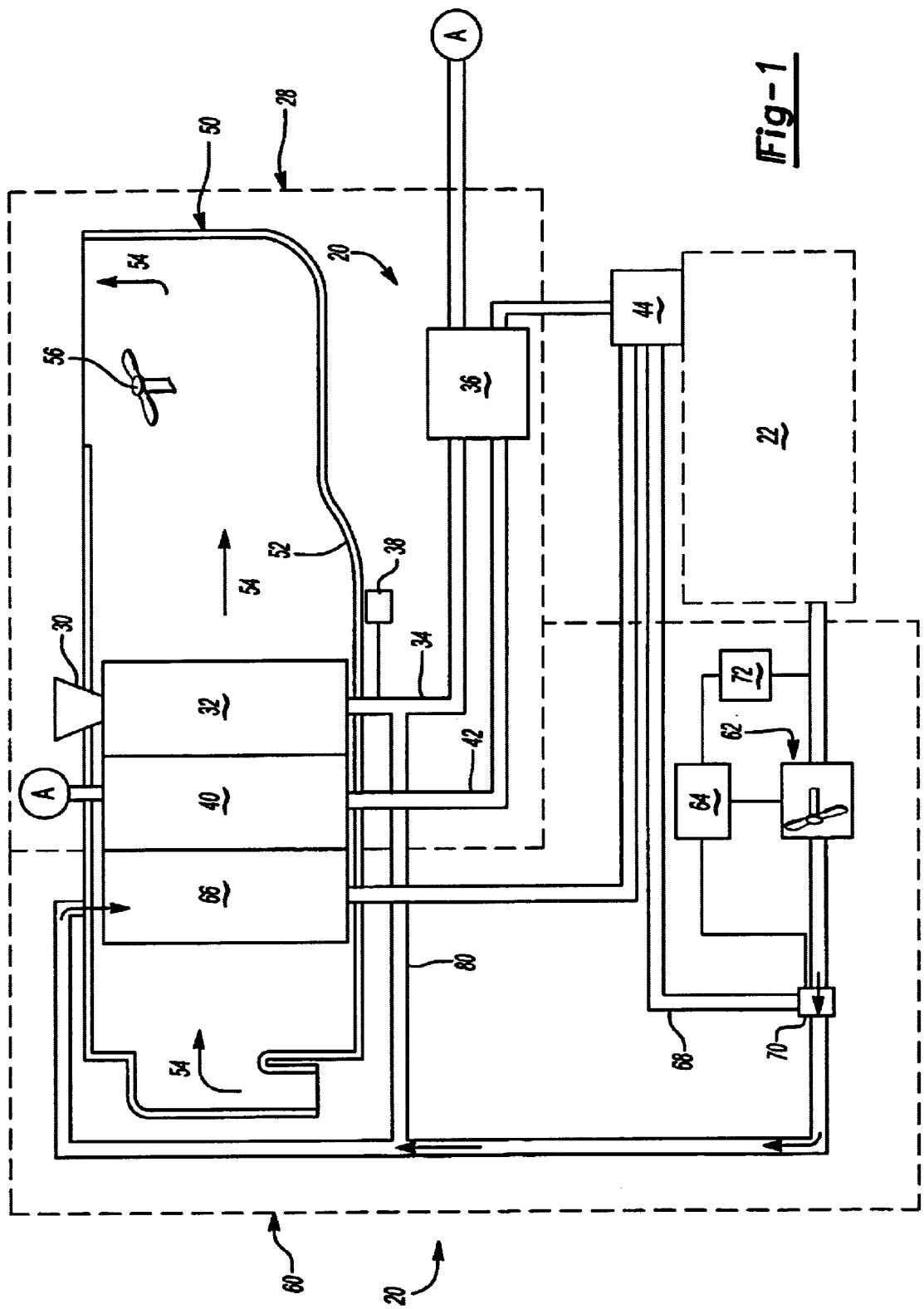
FIG. 1 schematically illustrates a system designed according to this invention.

A cabin air temperature control system 20 controls the temperature of an air supply to a cabin schematically shown at 22. In the case of an aircraft, the cabin 22 is pressurized. While the inventive arrangement is particularly useful for aircraft, it is not necessarily so limited.

The system 20 includes a first air circuit 28 having an air intake portion 30 that receives air from outside the aircraft cabin as known in the art. The intake air is processed through a primary heat exchanger 32, a plurality of conduits 34 and devices schematically illustrated at 36 including a compressor, for example. At least one temperature sensor 38 within the first circuit 28 provides an indication of the temperature of the air within the first circuit 28.

The first circuit 28 also includes a secondary heat exchanger 40 for further processing the air within the first circuit to enhance the ability of the system to achieve a desired air temperature. Air entering the secondary heat exchanger typically has been processed by the primary heat exchanger 32 prior to entering the secondary heat exchanger. The conditioned air output 42 of the secondary heat exchanger ultimately is provided to a mixer 44 and introduced into the cabin 22.

The operation of such heat exchangers and other components within such systems are known. For example, an air temperature control system is shown in U.S. Pat. No. 5,086,622, which issued on Feb. 11, 1992. The teachings of that document are incorporated into this description by reference.

The operation of the components of the first circuit preferably is controlled by a controller (not illustrated) to bring the temperature of the air in the first circuit close to a desired cabin temperature.

Depending on the needs of a current situation, the first circuit 28 preferably is capable of heat providing warm or cool air to the cabin 22.

The control system 20 includes an air cycle machine 50 having a housing 52 as known in the art. The primary heat exchanger 32 and secondary heat exchanger 40 preferably are supported within the housing 52. A flow of air schematically illustrated at 54 preferably flows through the housing 52 of the air cycle machine in a conventional manner. A fan 56 is provided for directing air through the housing 52 so that heat rejected by the heat exchangers 32 and 40 may be exhausted to atmosphere in a conventional manner. In the illustrated example, the secondary heat exchanger 40 is upstream of the primary heat exchanger 32 with respect to the flow 54 through air cycle machine housing 52.

The system 20 includes a second air circuit 60 that recirculates air from the cabin 22. A fan assembly 62 draws air from the cabin 22 and directs it through the second circuit 60 so that the air can then be reintroduced into the cabin 22. A controller 64 preferably controls the speed of operation of the fan 62 so that a desired amount of recirculating air flow is realized.

The inventive arrangement includes an air cooling assembly 66 in the second air circuit that is operative to selectively cool the recirculated air before it is reintroduced into the cabin 22. The illustrated example includes a heat exchanger as the primary component of the air cooling assembly 66 in the second circuit. Under circumstances where more cooling of the cabin air is desired, the air in the second circuit 60 preferably is directed through the heat exchanger 66 prior to being reintroduced into the cabin 22. The recirculated air preferably is mixed with the conditioned air from the first circuit in the mixer 44 so that a mixture of the conditioned air and the recirculated air is introduced into the cabin 22.

Under some circumstances, it will not necessarily be desirable to cool the recirculated air. Accordingly, the inventive arrangement includes a bypass flow pathway 68. A valve arrangement 70 preferably is controlled by the controller 64 to selectively direct the recirculated airflow through the bypass flow pathway 68 or through the heat exchanger 66 depending on the needs of a particular situation. A temperature sensor 72 provides an indication of the temperature of the air drawn from the cabin 22. The controller 64 preferably is programmed to determine whether the recirculated air should be cooled based upon a current temperature reading from the temperature sensor 72 and a currently selected cabin temperature. The controller 64 preferably also takes into account the temperature of the air being introduced into the cabin 22 from the first air circuit 28.

The controller 64 can be a commercially available microprocessor, for example. The not illustrated controller associated with the first circuit components can be part of the same microprocessor. Controllers for cabin air temperature control systems are known. The controller 64 may be a dedicated portion of such a controller or may be a separate microprocessor, for example. Those skilled in the art who have the benefit of this description will be able to select from among commercially available components and to suitably program a microprocessor to perform the functions of the controller 64 of this description.

In the illustrated example, the air heat exchanger 66 is supported within the same housing 52 as the primary heat exchanger 32 and secondary heat exchanger 40 of the first circuit 28. In one example, the heat exchanger 66 is upstream of the secondary heat exchanger 40 with respect to the air flow 54 through the housing 52. Such an arrangement allows the heat rejected by the heat exchanger 66 to then eventually be exhausted to atmosphere, for example, as the air cycle machine bypass air flows according to the arrows 54.

In another example, the heat exchanger 66 may be supported in another location within the system and may have its own housing, depending on the needs of a particular situation. The illustrated arrangement is believed to be particularly efficient in not requiring additional power consumption and minimizing the introduction of additional system components or complexity.

The speed of the fan 62 preferably is controlled by the controller 64 depending on the need for recirculated air through the second circuit 60. Additionally, the fan speed 62 preferably is adjusted depending on whether the recirculated air will be cooled by passing it through the heat exchanger 66. Adjusting the fan speed in this manner ensures that adequate recirculating airflow is achieved.

The illustrated example includes a further enhancement to air cooling capabilities according to this invention. Another flow passage 80 preferably is selectively utilized to allow at least some of the air processed by the primary heat exchanger 32 to be mixed into the flow of recirculated air prior to the recirculated air passing through the heat exchanger 66. This allows the air flowing through the pathway 80 to be cooled further beyond the temperature achieved by the primary heat exchanger 32. This allows for further cooling of the air from the first circuit prior to that air being introduced into the cabin 22. This further cooling also provides the advantage of reducing the workload on some of the other operative components 32, 36, 40 within the first circuit under some circumstances.

In one example, the flow pathway 80 is always open and available for some of the air from the primary heat exchanger 32 to be further cooled by the heat exchanger 66. In another example, a valve arrangement is selectively controlled to selectively allow a desired amount of air through the flow pathway 80 for the further cooling just described. A controller may utilize one or more conventional temperature sensors strategically placed within the system to determine when the further cooling of such air is desired.

A significant advantage of the inventive arrangement is that it reduces the overall power required to meet cabin temperature requirements by rejecting recirculation air heat without significantly impacting the cooling capacity of the air cycle machine 50 and the other portions of the first air circuit 28. This is particularly advantageous when an aircraft is on the ground in warm weather.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A passenger cabin air temperature control system, comprising:
   a first air circuit having an intake portion that receives air from outside of the passenger cabin and an outlet portion through which air is supplied into the passenger cabin;
   at least one air conditioning assembly in the first air circuit that is operative to adjust a temperature of the air received into the intake portion before it is supplied to the passenger cabin through the outlet portion;
   a second air circuit that recirculates non-compressed air from within the cabin back into the cabin;
   an air cooling heat exchanger in the second air circuit that is operative to selectively cool the non-compressed air received from within the cabin before the air is reintroduced into the cabin;

a temperature sensor that provides an indication of the temperature of the air received into the second air circuit and a controller that communicates with the temperature sensor and determines whether the air received into the second air circuit should be cooled, and a bypass flow path that is selectively closed to allow air from the passenger cabin to be cooled by the air cooling assembly or opened to prevent the air from the passenger cabin from being cooled by the air cooling assembly.

2. The system of claim 1, including a flow valve that is operative to open or close the bypass flow path and wherein the controller controls operation of the flow valve.

3. A passenger cabin air temperature control system, comprising:

a first air circuit having an intake portion that receives air from outside of the passenger cabin and an outlet portion through which air is supplied into the passenger cabin;

at least one air conditioning assembly in the first air circuit that is operative to adjust a temperature of the air received into the intake portion before it is supplied to the passenger cabin through the outlet portion;

a second air circuit that recirculates non-compressed air from within the cabin back into the cabin; and an air cooling heat exchanger in the second air circuit that is operative to selectively cool the non-compressed air received from within the cabin before the air is reintroduced into the cabin;

wherein the air cooling heat exchanger is supported in a housing of an air cycle machine through which the outside air flows and the air conditioning assembly includes at least one first circuit heat exchanger supported in the air cycle machine housing and wherein the air cooling heat exchanger is upstream of the first circuit heat exchanger relative to the outside air flow.

4. A passenger cabin air temperature control system, comprising:

a first air circuit having an intake portion that receives air from outside of the passenger cabin and an outlet portion through which air is supplied into the passenger cabin;

at least one air conditioning assembly in the first air circuit that is operative to adjust a temperature of the air received into the intake portion before it is supplied to the passenger cabin through the outlet portion;

a second air circuit that recirculates non-compressed air from within the cabin back into the cabin;

an air cooling heat exchanger in the second air circuit that is operative to selectively cool the non-compressed air received from within the cabin before the air is reintroduced into the cabin; and the air conditioning assembly includes at least one first circuit heat exchanger and including a flow passage between the first circuit heat exchanger and the air cooling heat exchanger that selectively permits some of the air cooled by the first circuit heat exchanger to be subsequently further cooled by the air cooling heat exchanger before the air cooled by the first circuit heat exchanger is introduced to the passenger cabin.

5. The system of claim 4, wherein the flow passage introduces at least some of the air cooled by the first circuit heat exchanger into the air received into the second circuit from the cabin upstream of the recirculated air heat exchanger.

6. The system of claim 1, including an air mixer portion that mixes the air from the first circuit and the second circuit prior to the mixed air being introduced into the cabin.

7. The system of claim 3, including an air mixer portion that mixes the air from the first circuit and the second circuit prior to the mixed air being introduced into the cabin.

8. The system of claim 4, including an air mixer portion that mixes the air from the first circuit and the second circuit prior to the mixed air being introduced into the cabin.

* * * * *